United States Patent [19]
Klein

[11] 4,427,157
[45] * Jan. 24, 1984

[54] PREPARATION OF STYRENE-POLYMER AND POLYOLEFIN MICRO-BITS

[76] Inventor: Max Klein, 257 Riveredge Rd., Tinton Falls, N.J. 07724

[ * ] Notice: The portion of the term of this patent subsequent to Dec. 8, 1998 has been disclaimed.

[21] Appl. No.: 150,737

[22] Filed: May 19, 1980

Related U.S. Application Data

[60] Division of Ser. No. 833,644, Sep. 15, 1977, Pat. No. 4,207,378, Continuation-in-part of Ser. No. 342,535, Mar. 16, 1973, abandoned.

[51] Int. Cl.³ .................. B02C 11/08; B02C 21/00; B02C 23/18; B30B 9/24
[52] U.S. Cl. ............................ 241/15; 100/39; 100/118; 210/160; 210/171; 210/400; 210/401; 241/23; 241/27; 264/140; 264/DIG. 9; 428/402; 428/407; 521/53; 521/918
[58] Field of Search ............... 264/53, 51, DIG. 9, 264/180; 210/224, 400, 401, 160, 171; 241/15, 3, 38, 23, 24, 101.5, 222, 65, 73, 101, 101.4, 247; 100/118, 39; 425/204; 428/402; 521/53, 918

[56] References Cited

U.S. PATENT DOCUMENTS

| | | | |
|---|---|---|---|
| 2,096,176 | 10/1937 | Harrington | 210/400 X |
| 2,316,283 | 4/1943 | Piperoux et al. | 241/3 X |
| 2,348,916 | 5/1944 | Magnus | 241/101 |
| 2,412,586 | 12/1946 | Knowland | 241/15 X |
| 2,442,940 | 6/1948 | Staudinger et al. | 264/53 |
| 2,548,909 | 4/1951 | Ryden | 241/3 X |
| 2,554,968 | 5/1951 | Thompson | 210/401 X |
| 2,873,663 | 2/1959 | Hawk et al. | 264/65 X |
| 2,997,968 | 8/1961 | Fitzpatrick et al. | 425/204 X |
| 3,001,728 | 9/1961 | Kircher, Jr. | 241/73 |
| 3,051,400 | 8/1962 | Kircher, Jr. | 241/101.4 |
| 3,064,701 | 11/1962 | Kircher, Jr. | 241/247 |
| 3,150,834 | 9/1964 | Doyle et al. | 241/15 |
| 3,488,411 | 1/1970 | Goldman | 264/53 X |
| 3,607,999 | 9/1971 | Corbett et al. | 264/51 X |
| 3,613,564 | 10/1971 | Adamski et al. | 210/401 X |
| 3,627,211 | 12/1971 | Leach | 241/3 |
| 3,630,820 | 12/1971 | Leach | 241/3 X |
| 3,717,307 | 2/1973 | Beck | 241/15 X |
| 3,815,833 | 6/1974 | Van Vliet et al. | 241/15 X |
| 3,833,178 | 9/1974 | Beck | 241/15 X |
| 3,897,011 | 7/1975 | Gray et al. | 241/15 |
| 3,949,941 | 4/1976 | Gray et al. | 241/15 X |
| 3,992,298 | 11/1976 | Davis | 100/118 X |
| 4,008,158 | 2/1977 | Davis | 210/400 X |
| 4,100,242 | 7/1978 | Leach | 264/333 X |
| 4,207,378 | 6/1980 | Klein | 428/402 |
| 4,304,873 | 12/1981 | Klein | 428/402 X |

FOREIGN PATENT DOCUMENTS

| | | | |
|---|---|---|---|
| 47-14862 | 5/1972 | Japan | 210/400 |
| 55-82125 | 6/1980 | Japan | 241/15 |

OTHER PUBLICATIONS

Fitzpatrick Company Bulletin No. 152. "Fitzmill Model D Comminuting Machine" The Fitzpatrick Company, 832 Industrial Drive, Elmhurst, Illinois 60126. 1968, 8 pp.

*Primary Examiner*—Philip E. Anderson
*Attorney, Agent, or Firm*—Dann, Dorfman, Herrell and Skillman

[57] ABSTRACT

Disclosed is the preparation of micro-bits of expanded styrene-polymers and of expanded polyolefins by comminuting the styrene-polymer or polyolefin in a particular combination of comminuting steps in a suitable comminutor that can provide that combination of steps and in the presence of water as a cooling agent. The polymer micro-bits, which are produced as an aqueous slurry, may be rendered dry-to-the-touch by vacuum filtration followed by passage through a filter press.

14 Claims, 1 Drawing Figure

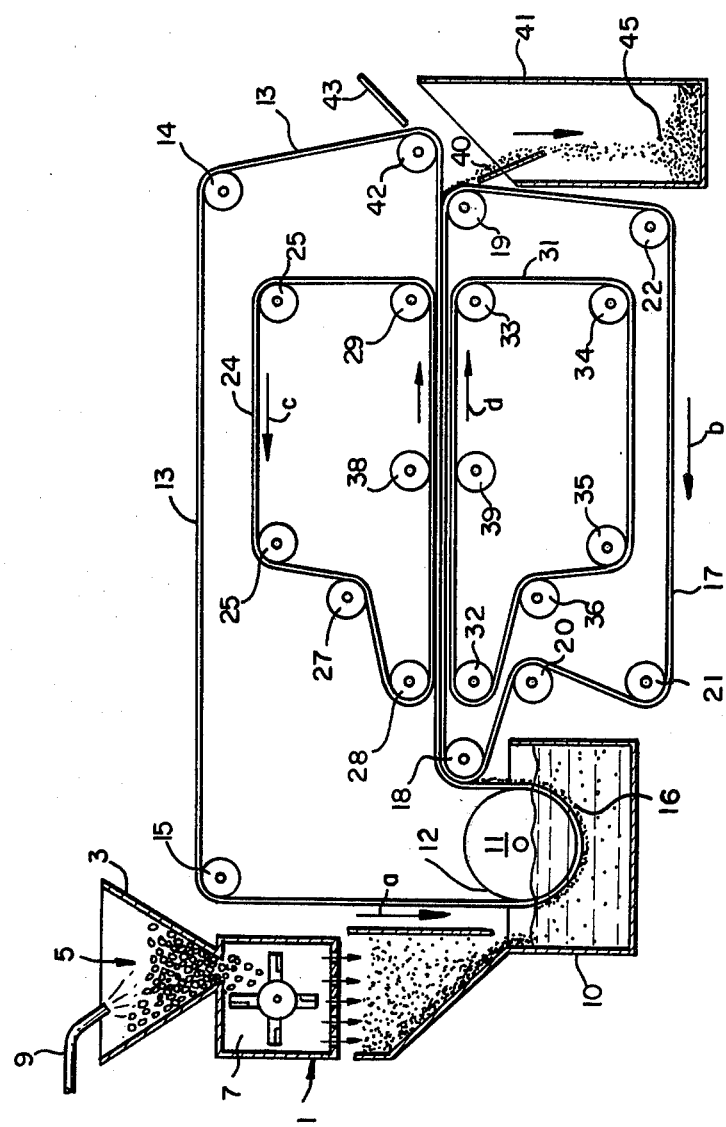

PREPARATION OF STYRENE-POLYMER AND POLYOLEFIN MICRO-BITS

This application is a division of my copending application Ser. No. 833,644 filed Sept. 15, 1977 now U.S. Pat. No. 4,207,378, which application was in turn a continuation-in-part of my then copending application Ser. No. 342,535 filed Mar. 16, 1973 (now abandoned).

This invention is that of a method of preparing micro-bits of an expanded thermoplastic polymer, which is non-brittle in its expanded form and selected from a styrene-polymer and a polyolefin from polyethylene to poly-methylpentene such as a polyethylene, polypropylene, a polybutene, and a poly-methylpentene, from so-called bit-pieces of the respective starting sytrene-polymer or polyolefin.

These micro-bits, which briefly may be called expanded styrene-polymer or expanded polyolefin micro-bits and the expanded styrene-polymers and expanded polyolefins and bit-pieces thereof, from which these micro-bits are obtained, are fully described in my aforesaid U.S. Pat. No. 4,207,378 at column 1, line 17 to column 3, line 61 (in relation to the FIGS. 1 through 16 of the drawings accompanying said patent and identified at column 3, line 6 to column 3, line 60), and also at column 8, lines 22 to 25, column 11, lines 55 to 58 and column 12, lines 41 to 50.

All of the above-identified portions of my aforesaid U.S. Pat. No. 4,207,378 are incorporated herein by reference as if they appear recited herein in full, and also the drawings.

The method of the invention involves preparing these expanded thermoplastic styrene-polymer or polyolefin micro-bits by continuously feeding expanded bit-pieces of a thermoplastic styrene-polymer or any of the aforesaid polyolefins and water into a confined comminuting zone, having a feed inlet to it, repeatedly impelling the resulting mixture of the starting bit-pieces in the water through a circular path by repeated impact on them in the water by a plurality of impact surfaces spaced apart from one another and rotated around the axis of said circular path at from about 4700 to about 8000 revolutions per minute, and at the same time by said impact surfaces driving said expanded bit-pieces to and against corner-shaped edges of a dispersed plurality of from substantially circular orifices (a) having a diameter of from about 0.102 to about 3.175 millimeters (i.e. mm.) to substantially rectangular orifices from about 0.254 to about 3.175 mm. in width by from about 3.81 to about 12.7 mm. in length, and (b) being arranged in screening array in an arcuate plane spaced radially out of range of said impact surfaces to an extent that need be only sufficient to avoid collision between said orifices and said impact surfaces, as from about 0.508 to 1.016 mm., and thereby repeatedly tearing, ripping and shearing microbits of the respective expanded polymer from said bit-pieces thereof; said fed in water being so proportioned to said fed in expanded thermoplastic polymer bit-pieces to prevent the content of the comminuting zone from reaching a temperature that would adversely effect the integrity of said starting bit-pieces and/or the desired micro-bits.

The method of the invention can be conducted by comminuting the respective starting expanded styrene-polymer or polyolefin bit-pieces in a comminuting machine (such as that produced by Fitzpatrick Company, of 832 Industrial Drive, Elmhurst, Ill. 60126, according to their Bulletin No. 152 copyright 1968) using the broached fixed blades (identified therein by "Code DS-225") to replace the blades or other comminuting elements, mounted for rotation in the comminuting chamber model DAS06, both shown on that bulletin's page 5. That chamber is liquid-tightly capped, for example, by a cover such as shown in their Code M44D6 or Code MA44D6 (upper half of page 3 of their Bulletin 152).

That model DAS06 comminuting chamber is rectangular in horizontal cross-section and has a pair of opposed parallel entirely vertical walls integrally joined at each of their opposite ends by a separate one of a pair of opposed vertically arcuate walls each with its convex face exposed to the exterior.

Sixteen identical, slat-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (25.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in a knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance). The screen's overall rectangular peripheral opening has such dimensions and shape to enable it to be removably fitted in a liquid-tight engagement with the bottom of the four walls of the comminuting chamber.

The screen has staggered rows of, for example, circular holes varying in diameter as from 0.102 to about 3.175 mm. and closely spaced to one another with sufficient space between them for the screen to hold up under working conditions.

Except for its starting material feed hopper inlet at one side of it, the rest of the chamber's cover is arcuate and convex upwardly with a radius (from the axis of operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4700 to about 8000 r.p.m., and more effectively from about 5000 to about 7500 r.p.m.

The micro-bits of the method of the invention are variously applicable, for example, in filtering and improving fluids, both liquid and gaseous. That is done, for example, by admixing the selected styrene-polymer or polyolefin micro-bits into the liquid to be improved and thereafter filtering them out, or by filtering the liquid to be improved through a bed of these micro-bits.

Some batches of these polymer micro-bits produced, for example, by the above-described comminuting machine using a screen having circular openings of some sizes, are obtained with content of varying amounts from very little or at times up to about 20% or so of fibrous particles still finer in size than that in the ranges described earlier above, for example, down to 15 microns or to 10 microns or so in width. Generally the presence of any such amounts of these smaller sizes may not introduce any disadvantage in the particular use that is to be made of the micro-bits.

However, if need be, these finer sizes can be removed by being filtered out by available screening or other suitable means, for example, a high capacity centrifugal sifter produced by the Kason Corporation, of Newark, N.J. This involves uniformly feeding the micro-bits by a feed screw discharging into a helical paddle rotating in a horizontally positioned cylindrical sifting chamber wherein centrifugal force accelerates movement of the micro-bit particles against the sieve which is attached to its supporting basket in a manner that lets the sieve vibrate freely.

In conducting the method of the invention, the operating conditions cause an increase in temperature of the fed in expanded thermoplastic styrene-polymer or polyolefin bit-pieces being disintegrated in the comminuting zone. That may be more marked with some styrene-polymers than with others, so that in some of them the temperature rise may reach a level such that at it and higher the styrene-polymer bit-pieces would not readily or satisfactorily tear or shear under the particular operating conditions and possibly have a tendency to stretch or otherwise modify the reaction of the material being treated, and so adversely effect the desired tearing or shearing of the starting bit-pieces or what already has been torn or shorn from them. That can be avoided, as by feeding more water with such bit-pieces.

The finished comminuted polymer micro-bits leaving the comminutor manifest the property of holding onto water to the extent of from possibly about 40 to 50 times their dry weight, and with its so held water forming a non-fluid plastic mass which is deformable and can roll, but without becoming fluid. The water is not released from this mass by draining or ordinary filtration, but requires pressure or suction, but yet it retains a significant amount of the water. For example, some high pressure reduces the mass to a water content of only about 50 percent.

The proportion of water fed into the comminuting chamber then should be at least enough for the mixture of water and produced polymer micro-bits to be sufficiently fluid readily to flow through the orifices of the screen bottom of the comminutor. Conveniently, the water should be from about 55 to about 100 times the weight of the produced expanded styrene-polymer micro-bits.

It is beneficial also to admix the starting expanded styrene-polymer or polyolefin bit-pieces with an amount of water sufficient substantially completely to wet their exposed surfaces before feeding them into the comminuting chamber.

It is advantageous also to the conduct of the method of the invention that the bit-pieces in the comminuting zone are driven by the impact surfaces alternately (i) to and against cornered edges of at least one pre-breaking or impact surface (of at least one pre-breaker bar described above) spaced circumferentially away from said orifices and radially similarly out of range of said impact surfaces as are said orifices, and then (ii) to and against said orifices.

It is also advantageous that the impact arms be axially and angularly spaced away from one another.

For some uses to be made of these styrene-polymer or polyolefin micro-bits, they can be used with the water which is held by them or any lower amount that is retained after either or both of application of pressure or vacuum to remove as much as it is desirable to remove of that which thus can be removed.

To remove the rest of the water when dry micro-bits are desired, one way is to freeze the product having the water content left after its partial removal by pressure and/or vacuum. Then the frozen micro-bits are left, or heated, to thaw out and attain a temperature just above freezing or up to ambient, at which the still retained water then freely drains off. When all that can drain off has left, the residual water can be expressed and/or withdrawn by vacuum followed by final drying.

Another and more practical way to remove the water held by the micro-bits discharged by the comminutor is described further below in relation to the system illustrated in the sole FIGURE of the drawing.

The invention is illustrated by, but not restricted to, the following examples:

EXAMPLE 1

Preparing Micro-Bits From Expanded Extruded Polystyrene Pellets 425 liters of expanding-agent-impregnated, extruded polystyrene pellets (crystal) expanded to from about 6.35 to about 12.7 mm. substantially round pellets having a bulk density of 12 grams per liter were comminuted in a comminuting machine (as described earlier above) equipped with an input feeder 10.16 cm. in diameter by 7.62 cm. long and a bottom arcuate screen with holes of 0.1016 mm. diameter.

The rotor was set to run at 6,000 r.p.m. and the feeder set to charge the expanded polystyrene bit-pieces at the rate of 35.4 liters every 5 minutes (i.e. 425 liters per hour). The starting expanded polystyrene bit-pieces to be introduced into the feeder were wetted with sufficient water substantially completely to cover their outer surfaces. The thus wetted expanded polystyrene bit-pieces were charged into the feeder continuously at a rate of 35.4 liters every 5 minutes, while at the same time water was injected into the comminuting chamber through the two 1.6 mm. diameter jet orifices at a rate of 7.57 liters per minute.

The mixture of the expanded polystyrene micro-bits leaving the screen bottom of the comminuting chamber was collected in open drums with bottom drain plugs, wherein the free water settled to the bottom and the polystyrene micro-bits with the bound water held by them in the proportion of 2 parts of micro-bits to 98 parts of water, due to the entrapped air rose on top of the free water. The free water was drained off leaving behind a particulate plastic mass of the (disintegrated) expanded polystyrene micro-bits with the water physically bound to them. The plastic mass weighed 255.15 kilos and contained 5.1 kilos of micro-bits with 250.05 kilos of water bound by them.

27.24 kilos of the particulate plastic mass then placed in a close weave double cotton bag were subjected to pressure until 22.71 liters of water were expressed. The remaining 4.08 kilos containing 544 grams of expanded polystyrene micro-bits then were dried in an open dish in an oven maintained at 110° F.

EXAMPLE 2

Micro-Bits From Expanded Impregnated Polystyrene Scrap

One inch pieces of impregnated polystyrene scrap having a bulk density of 16 grams per liter were treated by the same steps as in Example 1 but fed at the rate of 28.32 liters in 6 minutes and with the rotor at 6500 r.p.m., and in the same way yielded a particulate plastic mass like that obtained in Example 1 except for its having lighter grayish pink hue than that of the bulk of the starting impregnated scrap.

Replacing the starting expanded polystyrene bit-pieces of each of Examples 1 and 2 by some other quantity of bit-pieces of different density such as bit-pieces of virgin or scrap expanded polystyrene, or of any expanded styrene-acrylonitrile copolymer or of any other expanded styrene-polymer or any hereinabove and in my aforesaid U.S. Pat. No. 4,207,378 described applicable polyolefin, and separately respectively repeating the steps of either of those examples with the same or somewhat different proportions of water or different rotor rate, provides the corresponding relatively similar micro-bits of any other expanded styrene-polymer or of any expanded above described applicable polyolefin. The respective corresponding additional examples are to be considered as if presented herein in completely written out form, to avoid making this specification prolix.

By replacing the screen bottom of the comminutor described above by a screen of the same overall dimensions but instead having a herring-bone array of rectangular orifices 12.7 mm. long by 0.254 mm. wide, and using the thus changed comminutor in repeating Example 1 and Example 2, the selected starting material expanded styrene-polymer bit-pieces or expanded polyolefin bit-pieces similarly yield the same type of respective end product micro-bits being to the extent of substantially completely or entirely completely 100% of from about 5 to 15 microns wide and of many varying lengths up to about 325 microns and from substantially completely to completely free of intact cells.

The at least 98 percent of water in the fluid mixture or slurry of styrene-polymer or polyolefin micro-bits in water leaving the comminutor, as from the operation of either Example 1 or 2 or any of the foregoing modifications of any of them, can be removed considerably to provide dry-to-the-touch filter cakes, chunks or mats; of the respective styrene-polymer or polyolefin micro-bits having, for example, as much as about 80 to 84 percent solids or more, by a water-elimination method using a system such as is schematically shown in the accompanying drawings.

This method of producing such dry-to-the-touch (i.e. do not wet the fingers or palm of the hand when held in it) filter cakes, chunks or mats; of these respective polymer micro-bits from the highly aqueous slurry of them leaving the comminutor involves providing a continuous filter press means comprising involving interposing a first foraminous carrier member (e.g. wire gauze) between said polymer micro-bits slurry and a source of vacuum and thereby to apply reduced pressure to said aqueous slurry through said carrier member to an extent at least sufficient to deposit on said carrier member a removably adhering filter cake layer or web (of practical thickness, say, about 3.2 mm.) of said micro-bits with an intermediate reduced water content low enough to enable the web to retain its continuity on said carrier member, contacting the free surface of the adhering micro-bits web with a second foraminous member thereby sandwiching the micro-bits filter cake, layer or web between both said foraminous members, covering the free exposed side of each foraminous member with a continuous layer of water-absorbent sheet material having a greater water absorption capacity than that of said micro-bits filter cake, layer or web; then subjecting the filter cake, layer or web to pressure in the continuous filter press means to enable the layers of water-absorbent sheet material to absorb its practical capable extent of water from the micro-bits filter cake, layer or mat through the interposed foraminous members, and thereafter separating each layer of water-absorbent sheet material from its respectively contiguous foraminous member and separating each foraminous member from its respective surface of the further reduced in water content micro-bits filter cake, layer or mat, and discharging said latter filter cake, layer or mat.

A feature of this method is that it can be operated continuously in that each foraminous member and water-absorbent sheet is continuous and there is included a further step of then passing each separate water-absorbent material sheet (after the pressure-applying step) through a drying zone to rid these sheets of absorbed water to an extent to enable using them again to absorb water from successive further portions of intermediate water content reduced micro-bits mat picked up from the exit and of the vacuum application step.

Thus, with each foraminous member being continuous the first one of them is returned to the starting slurry there again under the influence of the vacuum to continue to pick up a continuous run of depositing micro-bits web. At the same time, the second continuous foraminous member returns to the discharge end of the vacuum zone to complete the sandwiching of the continuously forming micro-bits web between the two opposed continuous foraminous members. Then in turn each of the two continuous water-absorbent sheets continuously contacts the free surface of its respective foraminous member.

The continuous pressure applied by the continuous filter press means to the micro-bits filter cake, layer or web enhances the continuous absorption of water from the micro-bits web into the continuously opposed water-absorbing sheets through the foraminous members from the continuous micro-bits web. This web then continuously is discharged after the withdrawal of the water-absorbent sheets followed by the separation of the foraminous members, with each water-absorbent sheet continuing on through its respective drying zone.

Referring now to the sole FIGURE of the drawing which is a schematic representation of a preferred embodiment of apparatus for carrying out the method of the present invention there is shown a comminutor 1 of the kind described above, equipped with a hopper 3 for delivery of the polymer starting material in the form of bit-pieces 5 into comminuting zone 7 along with water from inlet pipe 9, which effects size reduction of the starting material. A slurry of micro-bits in water is discharged from the comminutor into the starting slurry-receiving tank 10. Spaced upwardly from the bottom of tank 10 and inwardly from its ends, vacuum drum 11 is mounted rotatably on its horizontal shaft 12 which is coaxial with vacuum drum 11, and supported outside of tank 10 on bushings (not shown) rotatably mounted on supports (not shown). A first continuous wire gauze filter screen 13 (e.g. 40 mesh, foraminous member) supported on idler rollers 14 and 15 travels in the direction shown by arrow a downwardly under and around the lower half of vacuum drum 11 where the wire gauze 13 passing through the slurry picks up a filter cake, layer or web 16 of partially water content reduced micro-bits.

A second wire gauze filter screen 17 (also 40 mesh, foraminous member) supported over rollers 18 and 19 passes over tensioning roller 20 and under guide rollers 21 and 22 in the direction shown by arrow b, thereby the intermediate water content micro-bits filter cakes, layer or web adhering to filter screen 13 is sandwiched between it and filter screen 17.

A continuous water-absorbing felt sheet 24 supported on rollers 25 and 26 travels in the direction shown by arrow c under tensioning roller 27 and around guide roller 28 and there continuing to guide roller 29. Thereby the stretch of screen 13 extending over the distance between rollers 28 and 29 covers the exposed surface of wire gauze screen 13.

A second water-absorbent felt sheet 31 supported over rollers 32 and 33 travels in the direction shown by arrow d under idler rollers 34 and 35 and over tensioning roller 36, whereby felt sheet 31 for the distance between rollers 32 and 33 contacts the exposed underside of filter screen 17. That then completes the operational assembly of the continuous filter press means for sandwiching the micro-bits filter cake, layer or web between the wire gauze filter screens 13 and 17 covered by the felt sheets 24 and 31 respectively.

Intermediate the two pairs of respectively opposed idler rollers 28 and 32 and 29 and 31, this assembly passes between opposed pressure rollers 38 and 39, whereby their 56 cm. length applies a total pressure of, for example, 408 kilos (thus 7.3 kilos per centimeter, i.e. cm) by pressure roller 38 against that assembly.

After felt sheets 24 and 31 separate at the junctions of rollers 29 and 33, the filter screens later separate as screen 17 passes down over idler roller 19. Then the micro-bits filter cake, layer or web reduced to a cake of 84 percent solids is removed from screen 17 by separator blade 40 and drops as pieces of disintergrated polymer micro-bits filter cake 45 into micro-bits cake receiver 41. At the same time the first or upper filter screen 13 passes upwardly around idler roller 42 and any micro-bits filter cake adhering to that screen is removed from it by upper separator blade 43 and drops as pieces of disintergrated polymer micro-bits filter cake into micro-bits cake receiver 41.

Operating the foregoing water content reducing system with a 28 cm. in diameter and 56 cm. in length vacuum drum 11 at a speed of 10 revolutions per minute (r.p.m.) with a feed of 11.4 liters per minute of styrene-polymer micro-bits slurry (containing 2 percent of solids) from the comminutor provided a 3.175 mm. thick wet micro-bits filter cake, layer, and with the foregoing 7.3 kilos per cm. pressure by pressure roller 38 gave a yield of 10.9 kilos per hour containing 84 percent of solids as styrene-polymer micro-bits.

In its respective drying zone (not shown) each water absorbent sheet can be hot air (or suitably otherwise) dried and with preliminary passage between pressure rolls when its water content is high enough that a significant part of it can be expressed.

The foregoing system and apparatus for removal from the micro-bits filter cake or layer of water or other liquid inert to them is not limited to its just above described specific use on expanded polystyrene micro-bits. The method and system also are applicable similarly to micro-bits of any of the other expanded styrene-polymer as well as to those of any polyolefin micro-bits. So also, the system is not restricted to the earlier above indicated dimensions or layout shown in the illustrative drawing, but can be modified to provide such other production capacity as is practical and variation in layout of the respective parts to meet particular requirements of plant production capacity and plant space accommodations.

The comminuting machine is not limited to the specific details of the illustrative applicable unit described earlier above. For example, the number of comminuting arms can be varied even up to 32 in relation to the specific plant production needs and the configuration of the housing can be modified accordingly. Some variation in certain parts of the comminuting arms also is possible. Those of its features which provide the effective comminuting function should be retained while allowing some variation in other areas of these arms. Also, the pre-breaker bars are not limited, for example, to the specific length or number, for either can be varied with respect to the specific production plan and in some cases they might be omitted.

The earlier above described system for withdrawing such large content of water from the micro-bits filter cake or layer is not limited to using a rotating vacuum drum on the micro-bits filter cake, layer or web of high water content before being passed through pressure rolls 38, 39 of the sole FIGURE. Slurry-receiving tank 10 and vacuum drum 11 and its shaft can be eliminated and rollers 18, 20 and 21 moved to about the left of the former location of tank 10 with filter screen 17 correspondingly extended. The slurry product from the comminutor is fed to a feed box (similar to the head-box from which paper pulp is fed to the fourdrinier in paper making) located above filter screen 17 (slightly to the right of roller 18) and discharging onto that screen. There the free water accompanying the micro-bits drains through the early portion of screen 17 after passing over roller 18. Before screen 17 reaches pressure rolls 28 and 39 it passes over a suction box (much like that at the fourdrinier discharge end) where part of the water held by the micro-bits is withdrawn.

Roller 15 is moved somewhat to the right so as to be located just to the right of the extension upward from roller 18. Screen 13 is shortened and maintained taut by running under a roller replacing drum 11 and positioned adjacent to wire screen 17 as it travels past the suction box. The filter cake or layer of wet micro-bits started on screen 17 is sandwiched between screens 13 and 17 as they continue after roller 18 to and through the nip between pressure rolls 38 and 39.

Water-absorbent sheets 24 and 31 beneficially are of cotton felt but can be of any other suitable water-absorbent sheet material having a greater affinity for water than the apparent surface tension holding the water to the micro-bits.

While the invention has been explained by the detailed description of certain specific embodiments of it, it is understood that various modifications and substitutions may be made within the scope of the appended claims which are intended also to cover equivalents of these embodiments.

What is claimed is:

1. A method for preparing micro-bits of an expanded thermoplastic polymer selected from the group consisting of,
   (i) a styrene-polymer,
   (ii) a polyolefin which is the polymer of an ethylenically unsaturated hydrocarbon having 2 to 6 atoms carbon,
   (iii) a melt alloy of polyethylene with about ten percent by weight of polystyrene,
   (iv) a copolymer of propylene with from about 20 to about 30 percent of ethylene by weight, and
   (v) a melt alloy of propylene in an amount exceeding 50 percent by weight of said alloy and a copolymer of ethylene and vinyl acetate to the extent of up to about 30 percent, each said polymer being non-brittle in expanded form, said micro-bits being from about 40 to about 325 microns long and from about 20 to about 325 microns wide, substantially free of intact cells of the starting expanded polymer from which said micro-bits are produced, and substantially without any uniformity in outline of the individual micro-bit particles, which method comprises:
   (a) feeding expanded bit-pieces of said expanded, thermoplastic polymer and water into a confined comminuting zone provided with a feed inlet, a discharge, and a plurality of spaced-apart impact surfaces rotatably mounted in said comminuting zone between said feed inlet and said discharge, said discharge comprising a dispersed plurality of orifices, said orifices ranging from substantially circular, having diameters from about 0.102 to about 3.175 millimeters to substantially rectangular, having widths from about 0.254 to about 3.175 millimeters and lengths from about 3.81 to about 12.7 millimeters, said orifices being arranged in arcuate screening array and spaced radially apart from said impact surfaces to an extent sufficient to avoid collision between said orifices and said impact surfaces; and
   (b) impelling said expanded, thermoplastic polymer bit pieces in said water through a circular path in said comminuting zone by repeated impact on them with said impact surfaces rotating at from about 4700 to about 8000 revolutions per minute, and at the same time driving said expanded, thermoplastic polymer bit pieces against the edges of said orifices with said impact surfaces, thereby comminuting said bit-pieces of said expanded, thermoplastic polymer by repeated tearing, ripping and shearing micro-bits from said bit-pieces; said water being so proportioned to said expanded, thermoplastic polymer bit-pieces in said feed to maintain the temperature in the comminuting zone below that at which degradation of said expanded thermoplastic polymer bit-pieces would occur.

2. The method as claimed in claim 1, wherein the surfaces of said expanded thermoplastic polymer bit-pieces are wetted with water prior to their being fed into said comminuting zone.

3. The method as claimed in claim 1, wherein said impact surfaces are axially and also angularly spaced apart from one another.

4. The method as claimed in claim 1, wherein said expanded thermoplastic polymer bit-pieces in said comminuting zone are driven by said impact surfaces repeatedly alternately (i) to and against cornered edges of at least one pre-breaking surface located between said feed inlet and said plurality of orifices and spaced circumferentially away from said orifices and radially similarly out of range of said impact surfaces as are said orifices, and (ii) to and against said orifices.

5. The method as claimed in claim 4, wherein there is a plurality of said pre-breaking surfaces and they are elongated and extend for about the width of said comminuting zone parallel to the axis of said circular path and are circumferentially spaced apart from one another about said axis.

6. The method as claimed in claim 1, wherein the ratio of the water fed with said thermoplastic polymer bit-pieces into said comminuting zone is from about 55 to about 100 times the weight of said bit-pieces.

7. The method as claimed in claim 1, wherein said micro-bits are discharged from said comminuting zone through said orifices as a slurry of them in water containing at least about one percent of said micro-bits as solids.

8. The method as claimed in claim 7, wherein said slurry of micro-bits in water continuously is fed into a liquid confining zone wherein there is supported a rotatable vacuum drum partially immersed in a body of said slurry maintained in said zone, and a first non-water-absorbent foraminous member passes into said body of slurry maintained in said confining zone and around under and in contact with the immersed part of said rotating vacuum drum whereby as suction is maintained in said drum as it rotates in said body of slurry with said first foraminous member moving in contact with the drum, a continuous filter cake or layer of water-holding micro-bits continuously is provided along said first foraminous member and as the latter leaves said body of slurry and approaches a second foraminous member, the filter cake or layer of water-holding micro-bits is sandwiched between both of said foraminous members as both of them come close enough for the second foraminous member to meet and continue in contact with said filter cake or layer of water-holding micro-bits.

9. The method as claimed in claim 7 wherein said slurry is subjected to vacuum filtration thereby to increase the solids content of said slurry to at least 16 percent by weight.

10. The method as claimed in claim 9, wherein said micro-bits continuously leave said comminuting zone as a slurry in said water, which slurry then is applied to one surface of a moving continuous first sheet of non-water-absorbent foraminous material continuously to provide on said one surface a removably adhering continuous filter cake or layer of partially de-watered micro-bits, applying suction to the other surface of said first foraminous member to withdraw therethrough part of the water from said filter cake or layer of micro-bits, covering the initially uncovered surface of said filter cake or layer of micro-bits with one surface of a second moving continuous sheet of a non-water-absorbent foraminous material thereby providing a moving sandwich of said micro-bits filter cake or layer between the opposed facing surfaces of both of said foraminous members, and the exposed surface of each of said foraminous members continually is covered by a continuous run of a water-absorbent sheet material having a stronger absorbent affinity for water than the surface tension holding the water to the micro-bits, thereby providing an operational assembly of said moving sheet materials sandwiching said micro-bits filter cake or layer assembly, sequentially passing said assembly through the nip between opposed rollers of a pair of pressure rollers constituted to provide against said assembly sufficient pressure to enhance significantly the absorption attraction of the water by the water-absorbent sheet material from said filter cake or layer of micro-bits; and as the consecutive portions of said assembly leave said pressure rollers, removing the micro-bits from said foraminous sheet material, thereby providing a micro-bits product consisting by weight of from 50 to about 90 percent micro-bits solids.

11. The method claimed in claim 1 wherein polystyrene micro-bits are produced from expanded, thermoplastic polystyrene bit pieces.

12. The method claimed in claim 1 wherein polyolefin micro-bits are produced from expanded, thermoplastic polyolefin bit-pieces.

13. A method for preparing micro-bits of an expanded thermoplastic polymer selected from the group consisting of,
(i) a styrene-polymer,
(ii) a polyolefin which is the polymer of an ethylenically unsaturated hydrocarbon having 2 to 6 atoms carbon,
(iii) a melt alloy of polyethylene with about 10 percent by weight of polystyrene,
(iv) a copolymer of propylene with from about 20 to about 30 percent of ethylene by weight, and
(v) a melt alloy of polypropylene in an amount exceeding 50 percent by weight of said alloy and a copolymer of ethylene and vinyl acetate to the extent of up to about 30 percent, each said polymer being non-brittle in expanded form, said micro-bits being from about 40 to about 325 microns long and from about 20 to about 325 microns wide, substantially free of intact cells of the starting expanded polymer from which said micro-bits are produced, and substantially without any uniformity in outline of the individual micro-bit particles, which method comprises:
(a) feeding expanded bit-pieces of said expanded, thermoplastic polymer and water into a confined comminuting zone provided with a feed inlet, a discharge, and a plurality of spaced-apart impact surfaces rotatably mounted in said comminuting zone between said feed inlet and said discharge, said discharge comprising a dispersed plurality of orifices, said orifices ranging from substantially circular, having diameters from about 0.102 to about 3.175 millimeters to substantially rectangular, having widths from about 0.254 to about 3.175 millimeters and lengths from about 3.81 to about 12.7 millimeters, said orifices being arranged in arcuate screening array and spaced radially apart from said impact surfaces to an extent sufficient to avoid collision between said orifices and said impact surfaces; and
(b) impelling said expanded, thermoplastic polymer bit-pieces in said water through a circular path in said comminuting zone by repeated impact on them with said impact surfaces rotating at from about 4700 to about 8000 revolutions per minute, and at the same time driving said expanded, thermoplastic polymer bit-pieces against the edges of said orifices with said impact surfaces, thereby comminuting said bit-pieces of said expanded, thermoplastic polymer by repeated tearing, ripping and shearing micro-bits from said bit-pieces; said water being so proportioned to said expanded, thermoplastic polymer bit-pieces in said feed to maintain the temperature in the comminuting zone below that at which degradation of said expanded thermoplastic polymer bit-pieces would occur;
(c) discharging said micro-bits from said comminuting zone through said orifices as an aqueous slurry containing at least about one percent micro-bits solids;
(d) feeding said aqueous slurry of micro-bits into a liquid confining zone wherein there is supported a rotatable vacuum drum partially immersed in a body of said slurry maintained in said zone, passing a first non-water-absorbent foraminous member into said body of slurry maintained in said confining zone and around under and in contact with the immersed part of said rotating vacuum drum, whereby as suction is maintained in said drum as it rotates in said body of slurry with said first foraminous member moving in contact with the drum, a continuous filter cake or layer of water-holding micro-bits continuously is provided along said first foraminous member; and
(e) continually applying to said filter cake or layer of water holding micro-bits as it exists said body of slurry a moving second foraminous member thereby providing an operative assembly of said moving sheet materials sandwiching said micro-bits filter cake or layer.

14. A method for preparing micro-bits of an expanded thermoplastic polymer selected from the group consisting of,
(i) a styrene-polymer,
(ii) a polyolefin which is the polymer of an ethylenically unsaturated hydrocarbon having 2 to 6 atoms carbon,
(iii) a melt alloy of polyethylene with about 10 percent by weight of polystyrene,
(iv) a copolymer of propylene with from about 20 to about 30 percent of ethylene by weight, and
(v) a melt alloy of polypropylene in an amount exceeding 50 percent by weight of said alloy and a copolymer of ethylene and vinyl acetate to the extent of up to about 30 percent, each said polymer being non-brittle in expanded form, said micro-bits being from about 40 to about 325 microns long and from about 20 to about 325 microns wide, substantially free of intact cells of the starting expanded polymer from which said micro-bits are produced, and substantially without any uniformity in outline of the individual micro-bit particles, which method comprises:
(a) feeding expanded bit-pieces of said expanded, thermoplastic polymer and water into a confined comminuting zone provided with a feed inlet, a discharge, and a plurality of spaced-apart impact surfaces rotatably mounted in said comminuting zone between said feed inlet and said discharge, said discharge comprising a dispersed plurality of orifices, said orifices ranging from substantially circular, having diameters from about 0.102 to about 3.175 millimeters to substantially rectangular, having widths from about 0.254 to about 3.175 millimeters and lengths from about 3.81 to about 12.7 millimeters, said orifices being arranged in arcuate screening array and spaced radially apart from said impact surfaces to an extent sufficient to avoid collision between said orifices and said impact surfaces;

(b) impelling said expanded, thermoplastic polymer bit-pieces in said water through a circular path in said comminuting zone by repeated impact on them with said impact surfaces rotating at from about 4700 to about 8000 revolutions per minute, and at the same time driving said expanded, thermoplastic polymer bit-pieces against the edges of said orifices with said impact surfaces, thereby comminuting said bit-pieces of said expanded, thermoplastic polymer by repeated tearing, ripping and shearing micro-bits from said bit-pieces; said water being so proportioned to said expanded, thermoplastic polymer bit-pieces in said feed to maintain the temperature in the comminuting zone below that at which degradation of said expanded thermoplastic polymer bit-pieces would occur;

(c) discharging said micro-bits from said comminuting zone through said orifices as an aqueous slurry containing at lest about one percent micro-bits solids;

(d) applying said slurry to one surface of a moving continuous first sheet of non-water-absorbent foraminous material to provide on said first surface a removably adhering continuous filter cake or layer of partially de-watered micro-bits;

(e) applying suction to the other surface of said first foraminous member to withdraw therethrough part of the water from said filter cake or layer of micro-bits;

(f) covering the initially uncovered surface of said filter cake or layer of micro-bits with one surface of a second moving continuous sheet of non-water-absorbent foraminous material thereby providing a moving sandwich of said micro-bits filter cake or layer between the opposed facing surfaces of both of said foraminous members;

(g) covering the exposed surface of each of said foraminous members continually with a water-absorbent sheet material having a stronger absorbent affinity for water than the surface tension holding the water to the micro-bits, thereby providing an operational assembly of said moving sheet materials sandwiching said micro-bits filter cake or layer, passing said assembly sequentially through the nip between opposed rollers of a pair of pressure rollers constituted to provide against said assembly sufficient pressure to enhance significantly the absorption attraction of the water by the water-absorbent sheet material from said filter cake or layer of micro-bits; and as the consecutive portions of said assembly leave said pressure rollers;

(h) removing the micro-bits from said foraminous sheet material, thereby providing a micro-bits product consisting by weight of from about 50 to about 90 percent micro-bits solids.

* * * * *